Dec. 31, 1968          H. REICHMANN          3,418,979
INSTANTANEOUS WATER HEATER HEATED BY A VAPORISED OIL BURNER
Filed Sept. 6, 1967
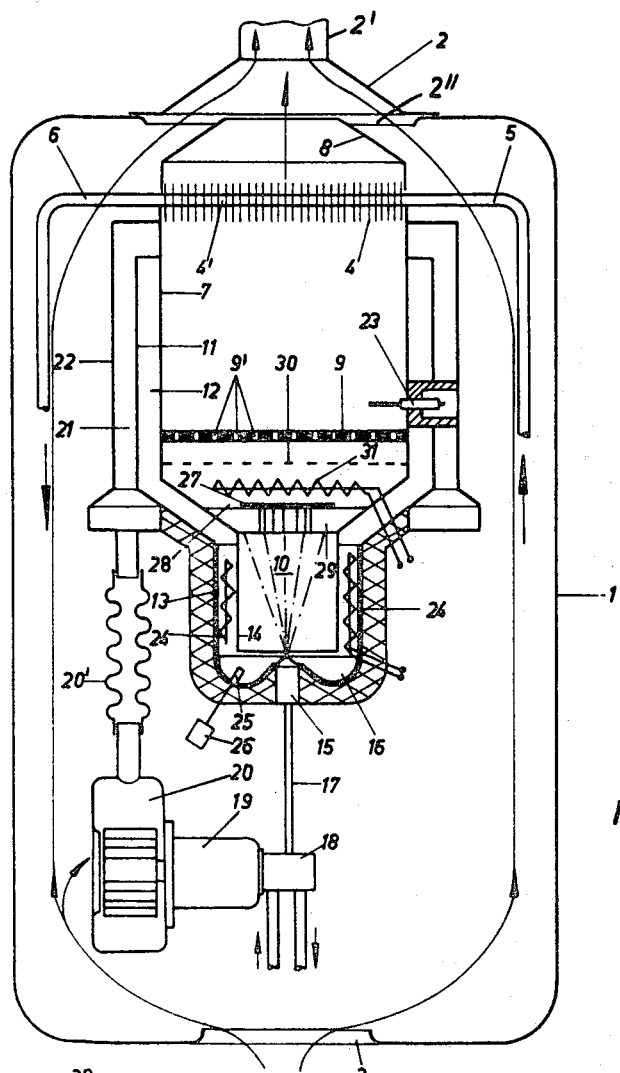
Fig.1
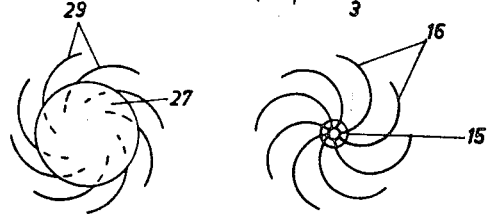
Fig.1b                    Fig.1a
INVENTOR:
Horst Reichmann
BY
Darbo, Robertson & Vandenburgh
attys

United States Patent Office 3,418,979
Patented Dec. 31, 1968

3,418,979
INSTANTANEOUS WATER HEATER HEATED BY A VAPORISED OIL BURNER
Horst Reichmann, Wuppertal-Elberfeld, Germany, assignor to Joh. Vaillant KG., Remscheid, Germany
Filed Sept. 6, 1967, Ser. No. 665,893
Claims priority, application Germany, Sept. 6, 1966, V 31,882; July 26, 1967, V 34,147
12 Claims. (Cl. 122—367)

ABSTRACT OF THE DISCLOSURE

An instantaneous water heater including a vaporised oil burner in which combustion air for the burner is fed thereto through an annular space surrounding a heating shaft in which combustion takes place and in which are mounted water flow tubes associated with a set of fins, the passage of the air through the annular space providing both preheating of the air and cooling of the heating shaft wall.

---

The invention relates to an instantaneous water heater having a set of fins mounted in a heating shaft and through which flow tubes extend, the heater also having a vaporised oil burner with blower disposed in the lower portion of the heating shaft. A vaporised oil burner has already been suggested in combination with instantaneous water heaters of the kind specified, in which a mixture of oil vapour and air is formed in hot air for combustion in a conically widening mixing chamber and burnt with a blue flame over a burner plate which is formed with burner apertures and closes off the mixing chamber at the top. Hitherto, the hot air for combustion required for oil vaporisation in the mixing chamber has been produced by supplying to the blower both fresh air and also a proportion of the hot waste gas, which is sucked off adjacent the flame. The blower has therefore had to be made of refractory materials and the blower bearings have had to be cooled.

On the other hand, in instantaneous water heaters of the kind specified the heating shaft is conventionally enclosed by a tube coil through which the flow water flows to cool the heating shaft wall and transfer heat to the flow water. Experience shows that with an arrangement of this kind the heating shaft must be made of copper, so that the tube coil can be soldered to the outside of the heating shaft. The cooling of the heating shaft wall is very uneven, since the cooling is slight between the tube coil turns, but it is often excessive at the places of contact of the tube coils.

It is an object of the invention to produce convenient heat distribution in an instantaneous water heater with a vaporised oil burner of the kind specified, to relieve the blower from hot waste gases which heat the air for combustion, and to achieve a more uniform cooling of the heating shaft wall by the removal of heat. A start can be made from the knowledge that in an instantaneous water heater of conventional construction only about 10% of the heat evolved is given off by the heating shaft wall to the tube coil and the flow water, while the heat exchange takes place mainly in the set of fins. On the basis of this knowledge, according to the invention, to produce the hot air for combustion, the air supplied by the blower is introduced into the mixing chamber from below, accompanied by cooling of the heating shaft wall not cooled by the flow water, via an annular space enclosing the whole heating shaft and the mixing chamber. Tube coil cooling of the heating shaft wall is therefore abandoned and the heat building up at that place is used instead of the admixture of waste gases hitherto needed for heating the air for combustion. It has been found that this method is just as effective as the admixture of waste gas to produce in the mixing chamber the temperatures of about 270° C. required for the vaporisation of the injected oil mist.

The method according to the invention affords a number of important advantages. The heating shaft wall is cooled more uniformly by the air for combustion. The heating shaft no longer needs to be made of copper, and the manufacture and soldering-on of a tube coil is obviated. The blower is not thermally loaded, but supplies only fresh air, and its bearings need not be cooled. Since with higher loading, the quantity of air for combustion used for cooling also rises, a kind of self-regulation of the mixing chamber temperature is achieved, since a larger quantity of cooling air corresponds to a larger amount of heat supplied to the heating shaft wall, so that the temperature remains substantially constant at all loadings.

Conveniently according to the invention, the blower is disposed below the mixing chamber and delivers the air for combustion into an annular chamber which encloses the annular space and is closed at the top, the air for combustion passing from the annular chamber with reversal of its direction of flow to the annular chamber. In that case an oil pump driven by the blower motor and feeding pressurised oil to the oil nozzle can be disposed coaxially with the blower. Conveniently, the blower is connected via a resilient tubular portion to a spigot of the annular chamber, so that vibrations and oscillations are not transmitted to the casing members.

In the arrangement described there is excess pressure in the shaft, so that the heating shaft and the adjoining mixing chambers must be sealing tight to prevent any heating gases from emerging. On the other hand, the blower supplies only the quantity of fresh air required for combustion. A relatively small volume of waste gases is produced and delivered through the flue with turbulent flow at low speed. There is therefore a risk that the waste gas may cool and condensates may be deposited on the flue walls. Moreover, if there is delayed ignition, there may be an explosion in the flue. The draught or back-up occurring in the flue may have a disadvantageous effect on combustion or on the speed of passage of the burner gases, since such draught or back-up affects the speed of delivery of the blower. Conveniently, therefore, the waste gas pipe is connected to a hood member connected in sealing-tight relationship to the jacket and mounted over a waste gas collecting hood so as to form therewith a draught interruption inside the jacket, and the lower portion of the jacket is formed with an air-supplying aperture below the blower. As a result of the draught interruption between the waste gas collecting hood and the hood of the jacket, air is also sucked in from the lower portion of the jacket by the flow of waste gas emerging under the effect of the blower from the waste gas collecting hood, and the flue draught. The extra air stream flows upwards along the outside of the heating shaft and along the burner casing, entraining the burner gas emerging at leaks. The extra air stream increases the volume of waste gas flowing through the flue, so that it fills out the flue and can flow away less turbulently under the effect of the flue draught. The extra air stream also dilutes any burner gas which arrives unburnt in the flue to such an extent that if there is delayed ignition no explosion occurs in the flue. It can be accepted that with a heavy back-up in the flue, waste gas may pass through the draught interruption into the jacket, but this waste gas is again sucked in by the blower and cannot therefore normally escape into the room where the heater is placed. With very unfavourable flue conditions, the jacket can be made completely sealing-tight, and an air-supplying tube extending from the room in which the heater is placed can be connected to the air-supplying aperture of the jacket.

In a further development of the invention, deflecting vanes which are disposed concentrically of the oil injection nozzle and put the air for combustion into rotation, are disposed in the inlet to the mixing chamber. The result is a cyclone-like eddy of hot air for combustion produced in the mixing chamber and surrounding the injected cone of oil mist. Moreover, there can be disposed in the conically widening portion of the mixing chamber a baffle plate which co-operates with the conical mixing chamber wall to bound an annular gap for the passage of the mixture of oil vapour and air. Eddy-producing deflecting vanes can be disposed in the annular gap to contribute towards better mixing of the oil vapour and air for combustion.

To heat the air for combustion from a cold start, electrical heating coils are disposed in the annular space at the level of the mixing chamber. Conveniently, for a cold start, an electrical heating coil is also disposed in the conically widening part of the mixing chamber to preheat the same, and avoid the formation of condensates. Advantageously, the casing enclosing the heating shaft and the mixing chamber, and also the walls of the annular space and the annular chamber are made of steel plate. There is then no longer the necessity of connecting wall portions of copper plate in sealing tight relationship to wall portions of steel plate, an operation which caused considerable technical difficulty.

An embodiment of the invention will now be described in detail with reference to the diagrammatic drawings. Disposed in a casing or jacket 1, having a waste gas pipe 2 at the top and formed with an aperture 3 at the bottom for the supply of fresh air, is a set of fins 4 through which flow tubes 4' extend and which are connected to the cold water lead 5 and a hot water lead 6. The set of fins 4 extends across a steel plate heating shaft 7. Extending after the fashion of a roof over the set of fins 4 is a waste gas collecting hood 8. Above the waste gas collecting hood 8 is a hood member 2 connected to the jacket 1, a waste gas pipe 2' extending to a flue being connected to the hood member 2. A gap 2" acting as a draught interruption is left between the hood member 2 and the waste gas collecting hood 8.

Disposed in the lower portion of the heating shaft 7 is a burner plate 9 formed with burner apertures 9' and closing off a mixing chamber 10. The mixing chamber 10 is cylindrical in its lower portion, widening conically in its upper portion, and adjoins the heating shaft 7 in sealing-tight relationship. The heating shaft 7 and the mixing chamber 10 are enclosed by an annular space 12 limited by a steel sheet wall 11. The steel sheet wall 11 is borne by a heat-insulating pot-shaped member 13 into which the downwardly open wall 14 of the mixing chamber 10 extends. A high pressure nozzle 15 plays oil mist into the mixing chamber 10 at an acute conical angle shown in chain-dot lines. Deflecting vanes 16 shown separately in FIGURE 1a are disposed in the inlet aperture of the mixing chamber 10 concentrically with the high pressure nozzle 15. The high pressure nozzle 15 is connected via a pressure line 17 to an oil pump 18 driven by an electric motor 19. The electric motor 19 also drives a fresh air blower 20 which is disposed coaxially with the oil pump 18 and blows fresh air via a resilient line 20' and a spigot into an annular chamber 21 which encloses the annular space 12 and is closed at its upper end above the open top of the annular space 12. The fresh air flows out of the annular chamber 21, reversing its direction of flow, into the annular space 12 and after again changing its direction enters the mixing chamber 10 from below inside the member 13. The fresh air is rotated by the deflecting vanes 16 so as to produce a cyclone-like air eddy. The annular chamber 21 is bounded outside by a steel plate jacket 22 and inside by the wall 11 of the annular space 12. As it flows through the annular space 12, the fresh air supplied by the blower 20 as air for combustion cools the hot wall of the heating shaft 7 and becomes so heated that when it enters the mixing chamber 10 it has a high temperature. The oil droplets of the oil mist sprayed in by the high pressure nozzle vaporise and gasify inside the hot air eddy in the mixing chamber 10, the result being a combustible mixture of oil vapour and air which passes through the apertures 9' in the burner plate 9 and burns thereabove with a blue, non-luminescent flame. An ignition device 23 is provided above the burner plate 9 to ignite the mixture.

Electrical heating coils 24 disposed in the annular space 12 at the level of the lower portion of the mixing chamber 10 are switched on when the burner starts from cold and heat the air for combustion flowing in the annular space 12, until the heating shaft 7 is heated by the burner flames. A heat senser 25 extending into the annular space 12 controls a thermostat 26 which switches off the heating coils 24 when the air for combustion reaches a predetermined temperature.

To improve combustion conditions, the widening portion of the mixing chamber 10 receives a baffle plate 27 co-operating with the conical mixing chamber wall 14 to bound an annular gap 28. As shown in FIGURE 1b, the annular gap 28 can receive whirl-producing deflecting vanes 29 which, just like a screen 30, contribute towards the superior mixing of the combustible mixture. Disposed between the baffle plate 27 and the screen 30 is a heating coil 31 which can be switched on and off by the thermostat 26 and which heats the mixing chamber 10, the baffle plate 27 and the screen 30 when the burner starts from cold, to prevent the formation of condensates at those places.

As a result of the action of the blower, the waste gas emerges from the waste gas collecting hood 8 and in conjunction with the flue draught sucks off through the gap 2" extra air through the inlet aperture 3, thus increasing the volume of waste gas. The extra air stream sucked off through the gap 2" flows inside the jacket 1 along the outside of the wall 22 and carries away residual burner gases emerging through leaks. With a back-up in the waste gas pipe 2', waste gas may sometimes pass through the gap 2" into the space of the jacket 1, but it is normally sucked in by the blower 20 and does not pass through the air-supplying aperture 3 into the room where the heater is placed. With frequent and heavy backing-up it may be convenient to make the jacket 1 sealing tight and to connect an air-supplying pipe (not shown) extending from the room in which the heater is placed to the air-supplying aperture 3.

I claim:

1. An instantaneous water heater comprising a wall defining a heating shaft, water flow tubes extending across said heating shaft, fins in said heating shaft through which said water flow tubes extend, a vaporised oil burner in said heating shaft comprising a mixing chamber having a frusto-conical portion diverging towards said heating shaft, an apertured burner plate separating said mixing chamber from said heating shaft and means for forming a mixture of oil vapour and air in said mixing chamber to be burnt in said heating shaft so that the products of combustion pass between the fins, means defining an annular space surrounding the heating shaft and mixing chamber, and a blower to supply air to said annular space and, through said annular space to the end of the mixing chamber remote from the burner plate, whereby the said air in passing through the annular space is heated and cools the heating shaft wall.

2. An instantaneous water heater as claimed in claim 1, wherein the heating shaft is positioned vertically above the mixing chamber and the blower is positioned below the mixing chamber, and further comprising an annular chamber surrounding the annular space, means closing the top of said annular chamber and connecting it to the top of the annular space and a connection between said blower and the bottom of the annular chamber, whereby air delivered by the blower into the annular chamber passes from said chamber into the annular space with reversal of its direction of flow.

3. An instantaneous water heater as claimed in claim 1 and further comprising an oil injection nozzle in said mixing chamber and air deflecting vanes in said mixing chamber disposed concentrically of the oil injection nozzle to produce rotation of the incoming air.

4. An instantaneous water heater as claimed in claim 1 and further comprising a baffle plate in the divergent portion of the mixing chamber which co-operates with the conical mixing chamber wall to define an annular gap for the passage of the mixture of oil vapour and air.

5. An instantaneous water heater as claimed in claim 4 and further comprising whirl producing deflecting vanes mounted in said annular gap.

6. An instantaneous water heater as claimed in claim 1, and further comprising electrical heating coils mounted in the said annular space at the level of the mixing chamber.

7. An instantaneous water heater as claimed in claim 1, and further comprising an electrical heating coil disposed in the frusto-conical portion of the mixing chamber.

8. An instantaneous water heater as claimed in claim 1 and further comprising an oil pump, a motor driving both said oil pump and the blower, said oil pump and blower being coaxially disposed, an oil nozzle projecting into said mixing chamber and conduit means connecting said oil nozzle to said oil pump.

9. An instantaneous water heater according to claim 2 and further comprising a spigot defining an inlet to the bottom of the annular chamber and a resilient tubular member connecting said blower to said spigot.

10. An instantaneous water heater according to claim 2, wherein the heating shaft wall, the mixing chamber and wall members defining the annular space and the annular chamber are made of steel plate.

11. An instantaneous water heater according to claim 1 and further comprising a jacket enclosing the heater, a hood member and a waste gas pipe leading from said hood member, said hood member making a gas-tight joint with said jacket, a waste gas collecting hood at the outlet end of the heating shaft and having an opening aligned with said waste gas pipe, said waste gas collecting hood and hood member defining between them a gap opening into the interior of the jacket, and means defining an air supply aperture at the other end of said jacket.

12. An instantaneous water heater as claimed in claim 11 and further comprising an air supply tube connected to the air supply aperture in the jacket.

References Cited

UNITED STATES PATENTS

| 624,889 | 5/1899 | Ashley | 431—328 |
| 1,137,465 | 4/1915 | Dick | 431—167 |
| 3,160,145 | 12/1964 | Miller | 122—367 |
| 3,194,215 | 7/1965 | Barnes | 431—167 X |

FOREIGN PATENTS

| 651,256 | 10/1937 | Germany. |
| 1,944,947 | 8/1966 | Germany. |

FREDERICK L. MATTESON, JR., *Primary Examiner.*

R. A. DUA, *Assistant Examiner.*

U.S. Cl. X.R.

431—167, 328